(12) United States Patent
Polynkin et al.

(10) Patent No.: US 6,504,976 B1
(45) Date of Patent: Jan. 7, 2003

(54) SPECTRAL POWER MONITORS WITH ACTIVE ALIGNMENT COMPENSATION

(75) Inventors: Pavel G. Polynkin, Fremont, CA (US); Jeffrey P. Wilde, Morgan Hill, CA (US); Michael J. Timmons, San Bruno, CA (US)

(73) Assignee: Capella Photonics, Inc., San Jose, CA (US)

( * ) Notice: Subject to any disclaimer, the term of this patent is extended or adjusted under 35 U.S.C. 154(b) by 0 days.

(21) Appl. No.: 09/992,778

(22) Filed: Nov. 14, 2001

Related U.S. Application Data

(63) Continuation-in-part of application No. 09/961,565, filed on Sep. 20, 2001.

(51) Int. Cl.[7] .............................. G02B 6/26; G02B 6/28; G02B 6/34; H04J 14/02
(52) U.S. Cl. .............................. 385/37; 385/15; 385/52; 385/24; 359/115; 359/124; 359/130
(58) Field of Search .............................. 385/15, 24, 37, 385/52; 359/115, 124, 130

(56) References Cited

U.S. PATENT DOCUMENTS 6,025,939 A * 2/2000 Lowenhar et al. ............ 359/34
6,239,891 B1 * 5/2001 Nakama ...................... 359/131
2002/0131698 A1 * 9/2002 Wilde ........................... 385/31

* cited by examiner

Primary Examiner—Brian Healy
Assistant Examiner—Kevin S Wood
(74) Attorney, Agent, or Firm—Gray, Cary, Ware & Freidenrich

(57) ABSTRACT

This invention provides a spectral power monitoring apparatus that uses a diffraction grating to separate a multi-wavelength optical signal along with a reference signal by wavelength into multiple spectral channels and a reference spectral component having a predetermined relative alignment, impinging onto an array of optical power sensors. The optical power sensor array may be configured such that the power levels of the spectral channels impinging onto the optical power sensor array can be related to the electrical signals thus produced by a predetermined conversion matrix. The spectral power monitoring apparatus of the present invention further includes an alignment compensation unit, which monitors the real-time impinging position of the reference spectral component and ensures that the corresponding conversion matrix is used for converting the measured electrical signals to the optical power levels of interest. The spectral power monitoring apparatus of the present invention is well suited for optical networking applications.

34 Claims, 7 Drawing Sheets

SPECTRAL POWER MONITORS WITH ACTIVE ALIGNMENT COMPENSATION

CROSS-REFERENCE TO RELATED APPLICATIONS

This application is a Continuation-in-part of U.S. patent application Ser. No. 09/961,565, pending, filed Sep. 20, 2001, which is incorporated herein by reference in its entirety.

FIELD OF THE INVENTION

This invention relates generally to optical systems. More specifically, it relates to a novel class of spectral power monitors in which optical alignment is actively managed by way of hardware or software control. The spectral power monitors of the present invention are well suited for WDM optical networking applications.

BACKGROUND

The prevalence of optical communication networks employing wavelength division multiplexing (WDM) has created a particular demand for spectral (channel) power monitors that operate over a broadband optical spectrum range with enhanced wavelength resolution, have sufficiently fast response time, are robust in performance, and are simple and cost-effective in construction.

Conventional spectral power monitors in the art typically use a wavelength-dispersing means, such as a diffraction grating, to separate a multi-wavelength optical signal into a spatial array of spectral channels. An array of optical detectors is positioned to detect the spectral channels in a one-to-one correspondence, thereby providing a power spectrum of the multi-wavelength optical signal. Alternatively, a rotating diffraction grating and an optical detector, or a movable optical detector and a stationary diffraction grating, are used to scan the spectral channels sequentially. Notable disadvantages of the prior spectral monitors employing arrayed optical detectors include stringent fabrication tolerances and painstaking alignment, rendering these devices high in cost and cumbersome in size and operation. Moreover, these prior devices lack dynamic mechanisms to overcome degradation in optical alignment owing to environmental effects, such as thermal and mechanical disturbances, over the course of long-term operation. An inherent disadvantage of the prior spectral power monitors employing a rotating grating (or a scanning optical detector) is that the underlying scanning mechanisms typically involve moving parts (e.g., motors) that require high maintenance and are rather limited in lifetime, thus making them unsuitable for communication networks. The slow scanning speed of these systems further impedes their wide application.

In view of the foregoing, there is a need in the art for a new line of spectral power monitors in which the optical alignment is actively controlled in a simple, robust, and cost-effective construction.

SUMMARY OF THE INVENTION

The present invention provides a spectral power monitoring apparatus employing active alignment compensation. The spectral power monitoring apparatus of the present invention comprises an input port, providing a multi-wavelength optical signal and a reference signal; a wavelength-disperser that spatially separates the multi-wavelength optical signal along with the reference signal by wavelength into multiple spectral channels and a reference spectral component having a predetermined relative arrangement (e.g., in a spatial array termed "spectral array" herein); an array of optical power sensors (termed "optical-sensing array" herein), including a reference-position-sensing element for receiving the reference spectral component and a plurality of channel-sensing elements for receiving the spectral channels; and an alignment compensation unit that monitors the relative alignment between the spectral array and the underlying optical-sensing array and compensates for any change in the alignment accordingly.

In the present invention, a "spectral channel" is characterized by a distinct center wavelength and associated bandwidth, and may carry a unique information signal as in WDM optical networking applications. A "reference signal" (and the corresponding "reference spectral component") generally refers to any optical signal characterized by a well-defined (and stable) wavelength that does not coincide with any of the wavelengths of the spectral channels under consideration.

In the spectral power monitoring apparatus of the present invention, the optical-sensing array (i.e., a photodiode array) may be configured such that the power levels of the spectral channels impinging on the photodiode array can be related to the electrical signals thus generated by a predetermined conversion matrix, which may be obtained from a calibration. Moreover, selected two (or more) adjacent channel-sensing elements in the optical-sensing array may be utilized such to provide for the reference-position-sensing element.

In one embodiment of the present invention, the alignment compensation unit is servo-based, and in one form may include an alignment-adjusting element for adjusting the alignment of the spectral channels along with the reference spectral component and a processing element. The alignment-adjusting element may be an actuation device coupled to the optical-sensing array for causing it to move, thereby adjusting the relative alignment between the spectral array and the underlying optical-sensing array. The processing element serves to monitor the real-time impinging position of the reference spectral component onto the reference-position-sensing element and to provide control of the alignment-adjusting element accordingly. The alignment compensation unit maintains the reference spectral component at a predetermined location on the reference-position-sensing element by way of servo-control, thereby ensuring the requisite alignment between the spectral array and the underlying optical-sensing array. Such a servo-based alignment compensation unit enables the spectral power monitoring apparatus of the present invention to actively correct for any shift in the alignment that may come about over the course of operation (e.g., owing to environmental effects such as thermal and mechanical disturbances), thereby enhancing the robustness of the apparatus. An additional benefit of using such a servo-based alignment compensation unit is manifested in relaxed fabrication tolerances and precision during initial assembly, rendering the spectral power monitoring apparatus of the present invention simpler and more cost-effective in construction.

In an alternative embodiment of the present invention, the alignment compensation unit is software-based, and may be in the form of a signal processor in communication with the optical-sensing array. The alignment compensation unit includes a predetermined calibration table containing a plurality of conversion matrices, each relating the electrical signals output from the optical-sensing array to the power levels of the impinging spectral channels at a particular impinging position of the reference spectral component. The alignment compensation unit monitors the real-time impinging position of the reference spectral component onto the reference-position-sensing element. At each impinging position of the reference spectral component thus detected, the alignment compensation unit processes the electrical signals produced by the spectral channels impinging onto the optical-sensing array and looks up a corresponding conversion matrix from the calibration table, thereby providing the power levels of the spectral channels. The spectral power monitoring apparatus thus constructed effectively compensates for any shift in the alignment that may arise over the course of operation by way of software control, without involving any "moving" actuation means. This renders the spectral power monitoring apparatus of the present invention a simpler construction with more robust performance.

In the present invention, the wavelength-disperser may be provided by a diffraction grating, such as a ruled diffraction grating, a holographic diffraction grating, a curved diffraction grating, an echelle grating, a transmission grating, a dispersing prism, or other types of wavelength-separating means known in the art. The input port may be provided by a fiber collimator coupled to an input optical fiber. In the event that the multi-wavelength optical signal is carried by the input optical fiber and the reference signal is provided by a reference light source, an optical combiner (e.g., a fiber-optic coupler) may be used to couple the reference light source to the input optical fiber. This provides a simple way of coupling both the multi-wavelength optical signal and the reference signal into the input port. Alternatively, a particular wavelength channel (e.g., a service channel) can be designated to serve as the reference signal on a network level, as might be in WDM optical networking applications, and transmitted along with various WDM signals through the communication system. The spectral power monitoring apparatus of the present invention may further include a beam-focuser, e.g., one or more focusing lenses, for focusing the spectral channels along with the reference spectral component into corresponding spectral spots.

The spectral power monitoring apparatus of the present invention may further employ a polarization diversity scheme, for mitigating any undesirable polarization-dependent effects that may be imposed by one or more polarization-sensitive elements in the system. This may be accomplished by disposing a polarization-separating element (e.g., a polarizing beam splitter) and a polarization-rotating element (e.g., a half-wave plate), along the optical path between the input port and the wavelength-disperser. The polarization-separating element serves to decompose the input multi-wavelength optical signal (along with the reference signal) into first and second polarization components, and the polarization-rotating element in turn rotates the polarization of the second polarization component by 90-degrees. For instance, in the event that the wavelength-disperser is provided by a diffraction grating that provides higher diffraction efficiency for p (or TM)-polarization (perpendicular to the groove lines on the grating) than for s (or TE)-polarization (orthogonal to p-polarization), the aforementioned first and second polarization components correspond to the p-polarization and s-polarization components of the multi-wavelength optical signal (along with the reference signal), respectively. The wavelength-disperser separates the first and second polarization components respectively by wavelength into first and second sets of optical beams, which subsequently impinge onto the optical-sensing array. The first and second optical beams (originating from the two polarization components) associated with each spectral channel may impinge at substantially the same location onto the optical-sensing array.

Such a polarization diversity scheme has the advantage of maximizing the diffraction efficiency and therefore minimizing the insertion loss of the system.

As such, the present invention provides a new line of spectral power monitors with active alignment compensation and maximized energy efficiency that are well suited for optical networking applications.

The novel features of this invention, as well as the invention itself, will be best understood from the following drawings and detailed description.

DETAILED DESCRIPTION

Figure 1:
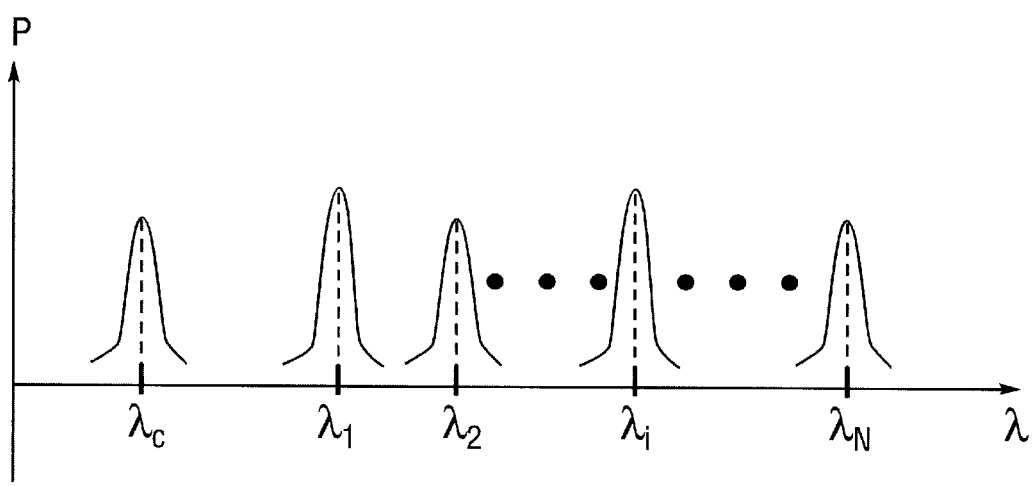
FIG. 1 provides a graphic illustration of an exemplary power spectrum of a reference spectral component and multiple spectral channels, according to the present invention.

FIG. 1 depicts an exemplary power spectrum, i.e., a plot of power P as a function of wavelength $\lambda$, of a reference spectral component $\lambda_c$ and multiple spectral channels $\lambda_1$ through $\lambda_N$. In this specification and appending claims, a "spectral channel" is characterized by a distinct center wavelength (e.g., $\lambda_i$) and associated bandwidth, as illustrated in FIG. 1. Each spectral channel may carry a unique information signal, as in WDM optical networking applications. A "reference spectral component", characterized by center wavelength $\lambda_c$, generally refers to any optical signal with a well-defined (and stable) wavelength that does not substantially coincide with any of the wavelengths of the spectral channels of interest. In FIG. 1, by way of example, the reference spectral component is shown to have a wavelength $\lambda_c$ that may be shorter than any of the wavelengths of the spectral channels under consideration. In general, the spectral channels need not be equally spaced in wavelength; and the bandwidth of the reference spectral component may be different from that of the spectral channels. The purpose of the reference spectral component will become apparent in the description as follows.

Figure 2A:
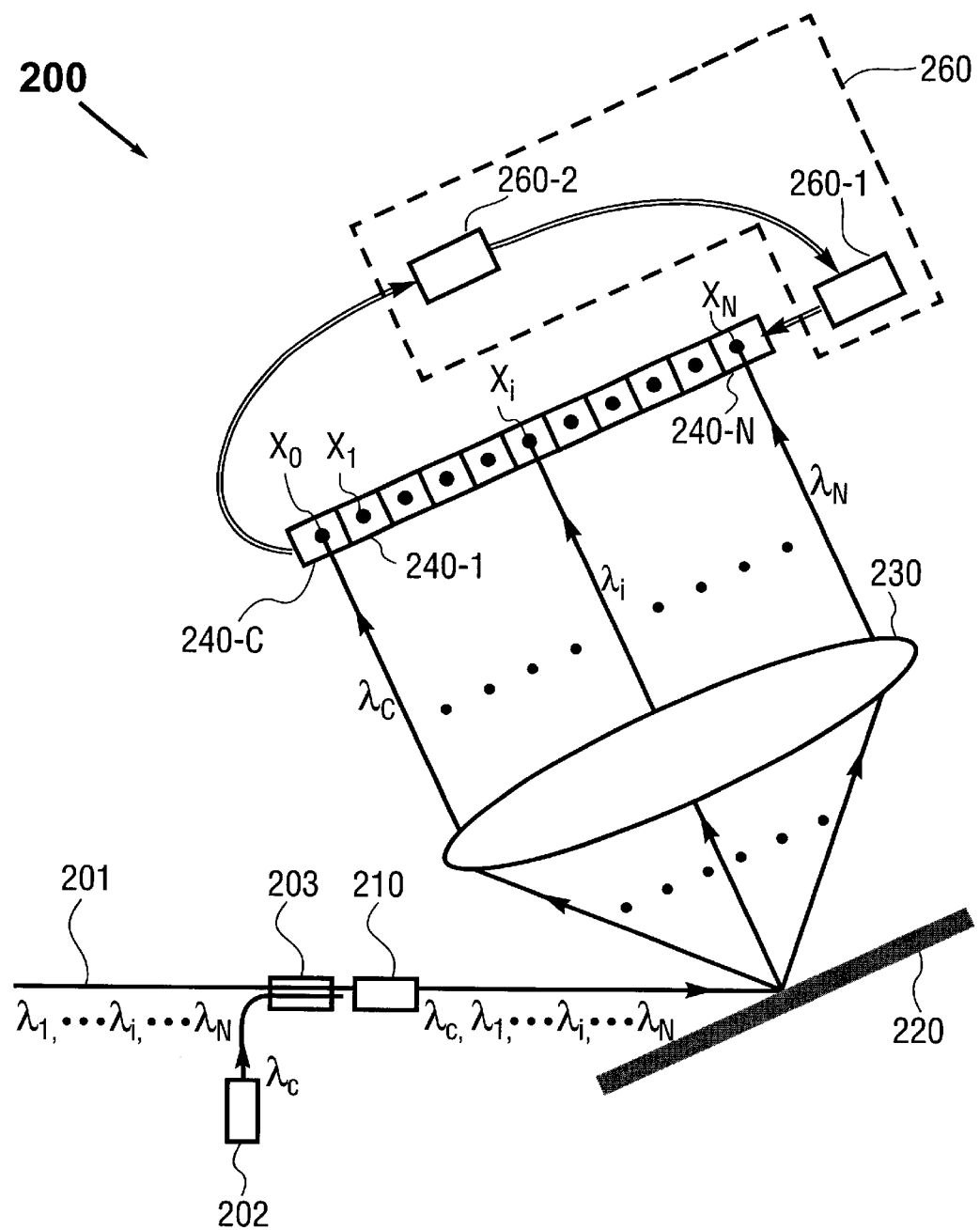
FIGS. 2A–2C depict a first embodiment of a spectral power monitoring apparatus according to the present invention, employing a servo-based alignment compensation unit.

FIG. 2A depicts an exemplary embodiment of a spectral power monitoring apparatus according to the present invention. By way of example to illustrate the principles and the general architecture of the present invention, the spectral power monitoring apparatus 200 comprises an input port 210 for a multi-wavelength optical signal which may be in the form of a fiber collimator; a wavelength-disperser 220 which in one form may be a diffraction grating; a beam-focuser 230 which may be a focusing lens; an array 240 of optical power sensors (termed "optical-sensing array", herein), providing a reference-position-sensing element 240-C and a plurality of channel-sensing elements 240-1 through 240-N. The optical-sensing array 240 may be integrated into a single structure (e.g., by mounting or fabricating the constituent elements on a substrate).

The spectral power monitoring apparatus 200 of FIG. 2A may operate as follows. The input port 210 transmits a multi-wavelength optical signal containing wavelengths $\lambda_1$ through $\lambda_N$ along with a reference signal containing wavelength $\lambda_c$. The diffraction grating 220 angularly separates the incident multi-wavelength optical signal along with the reference signal by wavelength into multiple spectral channels $\lambda_1$ through $\lambda_N$ and a reference spectral component $\lambda_c$ having a predetermined relative arrangement. The focusing lens 230 focuses the reference spectral component $\lambda_c$ and the spectral channels $\lambda_1$ through $\lambda_N$ into corresponding focused spots, e.g., in a spatial array (or "spectral array") with the predetermined relative arrangement. The optical-sensing array 240 may be positioned such that when the reference spectral component $\lambda_c$ impinges onto the reference-position-sensing element 240-C at a predetermined location $x_o$, the spectral channels $\lambda_1$ through $\lambda_N$ impinge onto the channel-sensing elements 240-1 through 240-N at designated locations $x_1$ through $x_N$, respectively.

It should be noted that the embodiment of FIG. 2A and the following figures are shown in schematic form, for illustrative purpose only. Various elements and optical beams are not drawn to scale. In general, there can be any number of the spectral channels in a spectral power monitoring apparatus of the present invention, so long as the number of the channel-sensing elements employed in the system is adequate for determining the power levels of the spectral channels with desired accuracy. Moreover, the focused spots of the diffracted optical beams impinging onto the optical-sensing array shown in FIG. 2A (and the following figures) may not be evenly spaced, and need not necessarily be in a one-to-one correspondence with the underlying channel-sensing elements, as will be described in further detail later.

The spectral power monitoring apparatus 200 of FIG. 2A may further comprise a servo-based alignment compensation unit 260, which in one form may include an actuation device 260-1 coupled to the optical-sensing array 240 and a processing element 260-2. The actuation device 260-1 is configured such to cause the optical-sensing array 240 as a whole—hence the reference-position-sensing element 240-C along with the channel-sensing elements 240-1 through 240-N in tandem—to move (e.g., translate and/or rotate), thereby adjusting a relative alignment between the spectral array formed by the diffracted optical beams and the underlying optical-sensing array 240. The processing element 260-2 monitors the real-time impinging position of the reference spectral component $\lambda_c$ on the reference-position-sensing element 240-C and provides servo (or feedback) control of the actuation device 260-1 accordingly, so as to maintain the reference spectral component $\lambda_c$ at the predetermined location $x_o$ and therefore the spectral channels $\lambda_1$ through $\lambda_N$ at the designated locations $x_1$ through $x_N$. The servo-based alignment compensation unit thus described enables the optical apparatus of the present invention to actively correct for any shift in alignment that may come about over the course of operation (e.g., owing to environmental effects such as thermal and/or mechanical disturbances), therefore increasing the robustness of the apparatus. An additional benefit of using such an alignment compensation unit is manifested in relaxed fabrication tolerances and precision during initial assembly, rendering the spectral power monitoring apparatus of the present invention simpler and more cost-effective in construction.

Figure 2B:
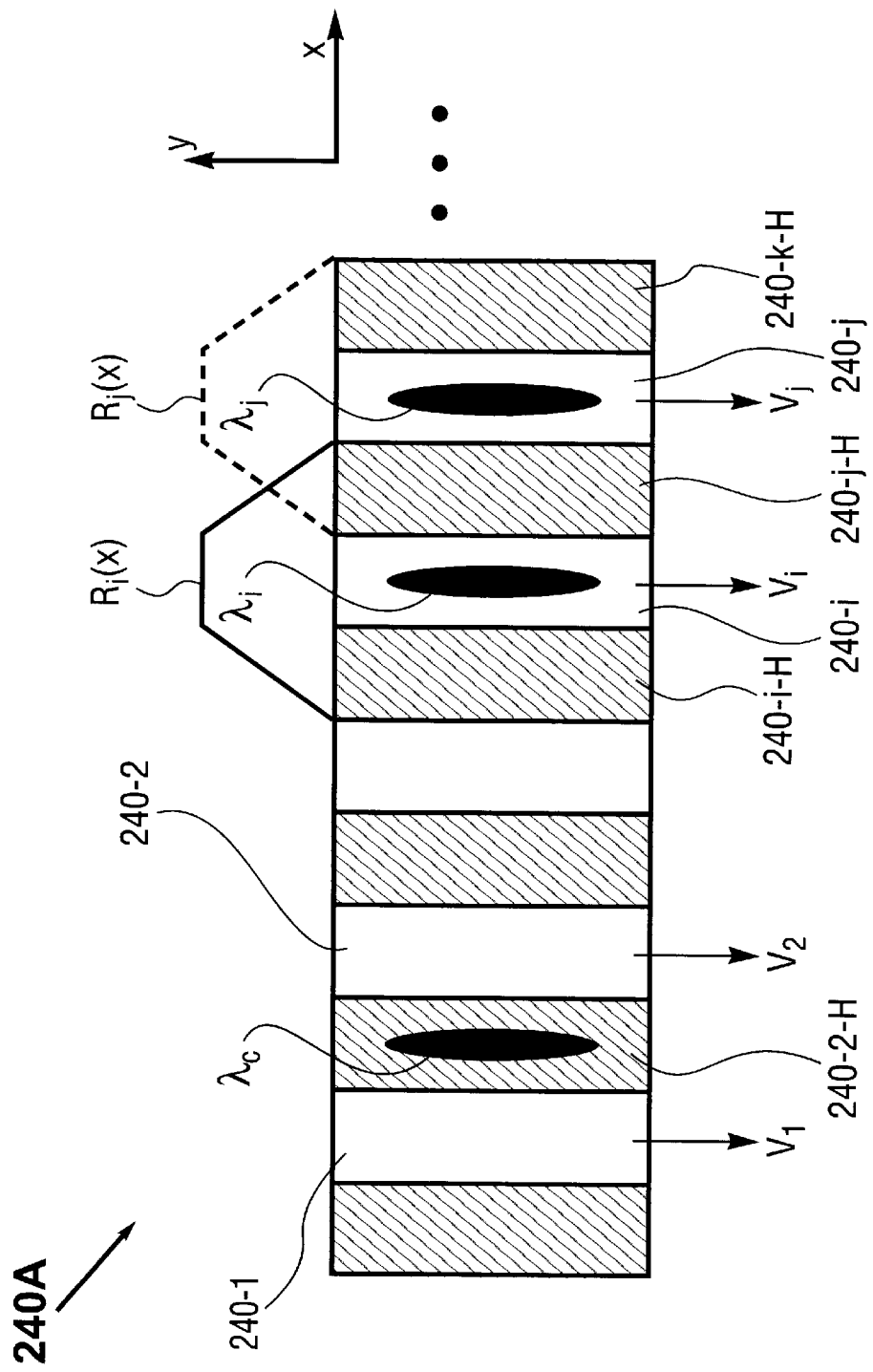

By way of example, FIG. 2B illustrates how an array of photodiodes may be implemented as the optical-sensing array 240 in the embodiment of FIG. 2A. Shown in FIG. 2B is an exemplary section of a photodiode array 240A in a magnified view, comprising a plurality of contiguous photo-sensing elements with varying photo-response characteristics as distinguished by non-hatched and hatched regions illustrated in the figure. As a way of example, photo-response function $R_i(x)$, as illustrated by solid lines in the figure, characterizes the photo-response of a non-hatched photo-sensing region 240-i and its two adjacent hatched regions 240-i-H, 240-j-H. Similarly, photo-response function $R_j(x)$, as illustrated by dashed lines, characterizes the photo-response of a neighboring non-hatched photo-sensing region 240-j and its two adjacent hatched regions 240-j-H, 240-k-H. A photo-response function relates the optical power impinging onto a photo-sensing element to the electrical (e.g., voltage) signal thus generated, as will be described in further detail later. By way of example, each photo-response function in FIG. 2B is shown to be nearly constant across the corresponding non-hatched region and decreases in a nearly linear fashion as moving away from the non-hatched region into the adjacent hatched regions, therefore exhibiting a "trapezoid-like" overall behavior. As such, the photodiode array 240A possesses a continuous overall photo-response function; that is also to say that there are no "dead zones" (or photo insensitive regions) on the photodiode array 240A. The photodiode arrays with the characteristics thus-described are commercially available, for instance, from Sensors Unlimited, Inc., Princeton, N.J.

As a way of example, the photodiode arrays contemplated in the ensuing discussion include appropriate detection circuits, such that the output signals may be in the form of voltage signals. It will be appreciated that the general principles and operation of the present invention are also applicable to other photodiode arrays or optical power sensor arrays whose output signals are in the form of current signals. It will also be appreciated that subscript i, j, or k in this specification may assume any integer value between 1 and N.

The photodiode array 240A in FIG. 2B may be configured such that voltage signals are output through the non-hatched regions. By way of example, voltage signal $V_i$ output from the non-hatched region 240-i may be given by $$V_i = \int R_i(x)I(x,y)dxdy \quad (1)$$

where the integration is taking place over the non-hatched region 240-i and its adjacent hatched regions 240-i-H, 240-j-H, and I (x, y) is the light intensity impinging upon the region of interest in the x-y plane defined in FIG. 2B. The photo-response function $R_i(x)$ is predetermined and based upon the characteristics of the photodiode array employed. Thus, the voltage signal $V_i$ takes into account the total optical power impinging upon the non-hatched region 240-i as well as its adjacent hatched regions 240-i-H, 240-j-H. Likewise, voltage signal $V_j$ output from the non-hatched region 240-j is related to the total optical power impinging upon the non-hatched region 240-j and its adjacent hatched regions 240-j-H, 240-k-H. Moreover, because of the intertwined relationship between two spatially adjacent photo-response functions, such as $R_i(x)$ and $R_j(x)$, the power level of an optical beam impinging upon a hatched region, such as the hatched region 240-i-H sandwiched between the non-hatched regions 240-i, 240-j, can be obtained from the measured voltage signals $V_i$ and $V_j$. Such is also the case anywhere else in the photodiode array 240A. Hence, each non-hatched region along with its adjacent hatched regions, such as the non-hatched region 240-i and the adjacent hatched regions 240-i-H, 240-j-H, constitutes a channel-sensing element (or pixel) in the present invention.

In addition, two adjacent channel-sensing elements in the photodiode array 240A may be utilized as a "split detector" to provide for a reference-position-sensing element (e.g., the reference-position-sensing element 240-C in the embodiment of FIG. 2A) for the reference spectral component $\lambda_c$. This may be accomplished by measuring the voltage signals $V_1$, $V_2$ output from the non-hatched regions 240-1, 240-2 respectively using an appropriate normalized differential detection scheme known in the art, for example, by way of monitoring a position error signal $(V_1-V_2)/(V_1+V_2)$. Such a normalized differential detection scheme has the advantage of improving the signal-to-noise (SNR) ratio of the detection via common mode rejection of amplitude noise. As a way of example, the impinging location of the reference spectral component $\lambda_c$ may be positioned on a hatched region 240-2-H sandwiched between two adjacent non-hatched regions 240-1, 240-2, such that either of voltage signals $V_1$, $V_2$ output from the non-hatched regions 240-1, 240-2 respectively varies with the position of the reference spectral component $\lambda_c$ in a nearly linear fashion. In this scenario, a single channel-sensing element, such as that associated with either of the non-hatched regions 240-1, 240-2, may also be used as the reference-position-sensing element.

The spectral power monitoring apparatus 200 of FIG. 2A may be configured such that the spectral channels impinge onto the non-hatched regions of the photodiode array 240A in a one-to-one correspondence; and the spectral spots formed by the spectral channels are confined within the respective non-hatched regions, as illustrated in FIG. 2B. By way of example, the non-hatched region 240-i may be designated for the spectral channel $\lambda_i$, whereas the non-hatched region 240-j may be assigned to the spectral channel $\lambda_j$. In this way, the voltage signals output from the non-hatched regions are proportional to the power levels of their corresponding spectral channels respectively, since in each non-hatched region (e.g., the non-hatched region 240-i) only one photo-response function (such as $R_i(x)$) is in control. For instance, the voltage signal $V_i$ is directly proportional to the power level of the spectral channel $\lambda_i$ impinging onto the non-hatched region 240-i, and the associated proportionality factor may be obtained from a calibration, as to be described in further detail later. Such a configuration also takes advantage of the uniform photo-response characteristics in the non-hatched regions, rendering any shift in the impinging position of a spectral channel within the corresponding non-hatched region practically inconsequential. Furthermore, the processing element 260-2 in the embodiment of FIG. 2A may employ a suitable differential detection scheme known in the art to measure the aforementioned voltage signals $V_1$, $V_2$, such that the deviation of the actual impinging position of the reference spectral component $\lambda_c$ from the prescribed location can be readily monitored. The processing element 260-2 may in turn use the detected deviation in the impinging position of the reference spectral component $\lambda_c$ to generate appropriate control signals to be applied to the actuation device 260-1, so as to maintain the reference spectral component $\lambda_c$ at the prescribed location and thereby ensure the requisite alignment between the spectral channels and the corresponding channel-sensing elements. As such, the embodiment of FIG. 2B provides one embodiment of the optical-sensor array 240 in FIG. 2A.

Figure 2C:
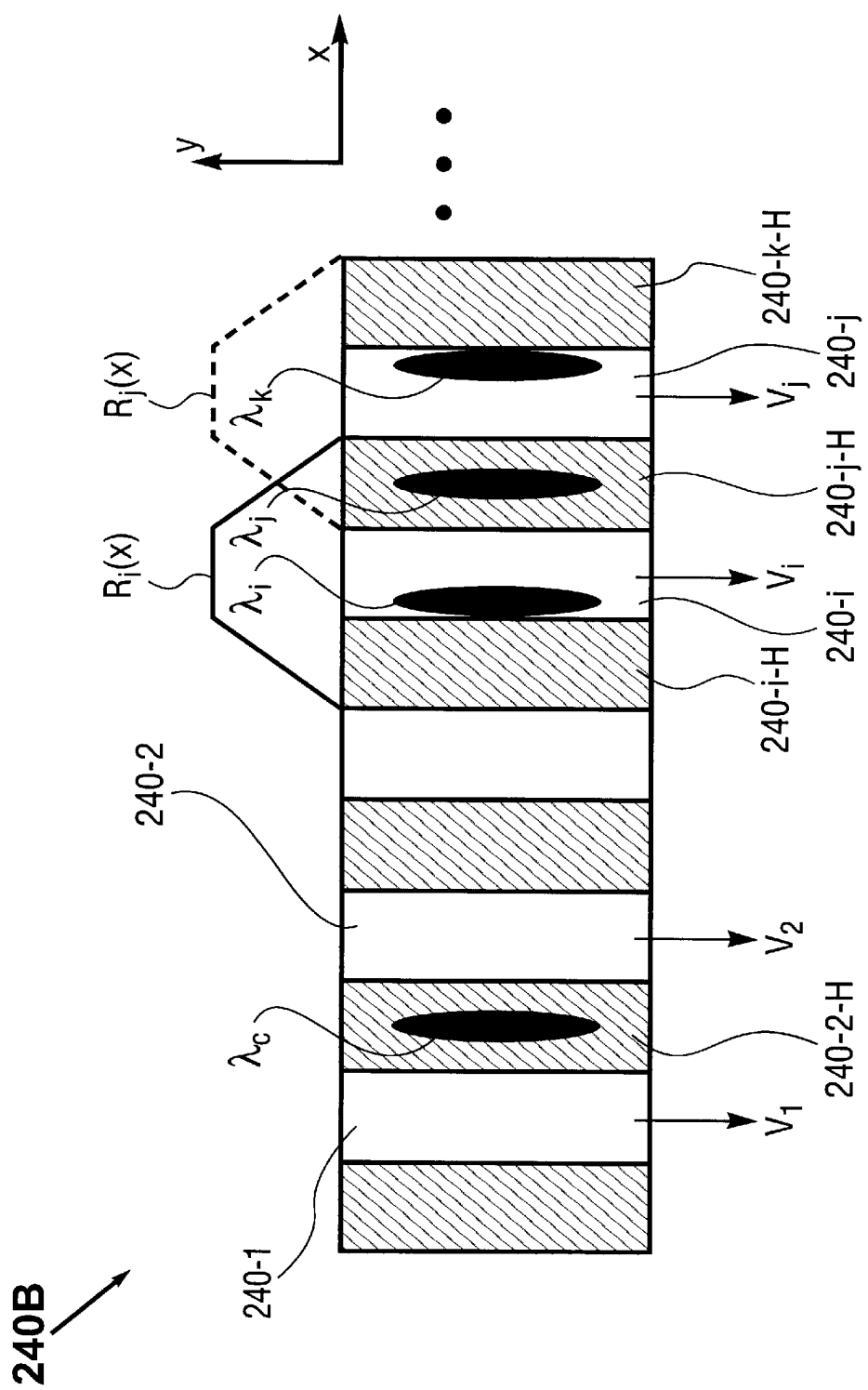

In certain situations, it might be difficult to confine the spectral spots of the spectral channels within the non-hatched regions in the corresponding channel-sensing elements (e.g., in the manner illustrated in FIG. 2B). The spectral array formed by the diffracted optical beams may also have a non-uniform pitch, meaning that the spacing between any two adjacent spectral spots may not be constant. Either scenario may result in a situation where one or more channel-sensing elements each receive more than one spectral channel, and in some instances, the spectral spots may overlap. FIG. 2C depicts an exemplary embodiment of how a photodiode array as described in FIG. 2B might be utilized in such applications.

By way of example, the photodiode array 240B shown in FIG. 2C may be substantially similar to the photodiode array 240A of FIG. 2B in configuration and operation, hence the elements are labeled with identical numerals. For purpose of illustration and clarity, only three spectral channels $\lambda_i$, $\lambda_j$, $\lambda_k$ are explicitly indicated; and the spectral channels are shown to be positioned such that one or more channel-sensing elements may each receive more than one spectral channel. For example, the channel-sensing element associated with the non-hatched region 240-i receives, at least, the spectral channels $\lambda_i$, $\lambda_j$; likewise, the channel-sensing element associated with the non-hatched region 240-j receives, at least, the spectral channels $\lambda_j$, $\lambda_k$. Based on Eq. (1), the voltage signal $V_i$ output from the non-hatched region 240-i can be generally expressed as $$V_i = \int R_i(x) \left[ \sum_{n=1}^{N} I_n(x, y) \right] dx\,dy \qquad (2)$$

where $I_n(x, y)$ is the light intensity associated with the spectral channel $\lambda_n$ (n=1 through N) in the region of interest. One skilled in the art will appreciate that Eq.(2) is applicable to any spectral channel of interest (that is, i=1 through N in the above). Hence, if the power levels $P_1$ through $P_N$ of the spectral channels impinging upon the photodiode array 240B are represented by an optical power vector (P), and the voltage signals $V_1$ through $V_M$ (M≧N) thus generated from the photodiode array 240B are represented by a voltage vector (V), (P) and (V) may be related as follows:

$$(V)=[T](P) \qquad (2)$$

where [T] is an (M×N) transfer-matrix. The transfer-matrix [T] generally depends upon the relative alignment between the spectral channels and the underlying channel-sensing elements, as well as the intrinsic properties (such as the photo-response characteristics) of the photodiode array employed. The transfer-matrix [T] is typically band-diagonal, unless one or more channel-sensing elements each receive multiple spectral channels. Those skilled in the art will recognize that Eq. (2) above is also applicable to the embodiment of FIG. 2B, where N=M and the transfer-matrix [T] is truly diagonal.

Based on Eq. (2) above, it follows that $$(P)=[C](V) \qquad (3)$$

where [C] is an (N×M) conversion matrix and can be derived from the transfer-matrix [T] in Eq. (2). To determine the transfer-matrix [T], a calibration may be performed (e.g., at the factory), where calibration optical signals characterized by substantially the same wavelengths as the spectral channels to be detected and having known power levels are coupled into the input port 210 in FIG. 2A, thereby traversing substantially the same optical paths as the spectral channels would undertake. (The calibration optical signals may be provided by a tunable laser, for instance.) The output voltage signals of the photodiode array 240B in response to the incident calibration optical signals are then measured. By substituting the measured voltage signals and the known power levels of the calibration optical signals into Eq. (2), the transfer-matrix [T] can be computed. The conversion matrix [C] in Eq. (3) can be further derived from the transfer-matrix [T] by means of a suitable matrix computation algorithm known in the art. The conversion matrix [C] thus obtained may be stored in a system memory, e.g., in a signal processor that may be part of the processing element 260-2 in FIG. 2A. Subsequently in the course of operation, the conversion matrix [C] stays substantially unchanged, so long as the spectral channels remain impinging at substantially the same locations on the photodiode array 240B as did the calibration optical signals. The requisite alignment may be maintained by the aforementioned servo-based alignment compensation unit 260 in FIG. 2A, for example. This enables the signal processor to readily compute the power levels of the spectral channels impinging upon the photodiode array 240B from the voltage signals thus generated, in a manner according to Eq. (3). One skilled in the art will recognize that if so desired in a practical application, any background contribution (e.g., due to the "dark current" of the photodiode array and/or to "stray light" from the environment) can be independently determined, and subsequently taken into account in the calibration and operation processes described above.

In the embodiment of FIG. 2C, the impinging position of the reference spectral component $\lambda_c$ may also be monitored by measuring the voltage signals $V_1$, $V_2$ output respectively from the non-hatched regions 240-1, 240-2 using an appropriate normalized differential detection scheme, for example, by way of detecting the position error signal $(V_1-V_2)/(V_1+V_2)$ in a manner as described with respect to FIG. 2B. As such, the embodiment of FIG. 2C may be alternatively implemented in FIG. 2A to embody the optical-sensing array 240.

Referring back to the embodiment of FIG. 2A. The actuation device 260-1 may be a stepping motor, a solenoid actuator, a piezoelectric actuator, a voice coil actuator, or other types of actuation means known in the art. The processing element 260-2 may include electrical circuits, controllers and signal processing algorithms for processing the output signals received from the reference-position-sensing element 240-C (e.g., the voltage signals $V_1$, $V_2$ output from the optical-sensing array 240A in FIG. 2B) and deriving from the detected signals the real-time impinging position of the reference spectral component $\lambda_c$. The processing element 260-2 accordingly generates appropriate control signals to be applied to the actuation device 260-1, so as to adjust the alignment of the reference spectral component $\lambda_c$ along with the spectral channels $\lambda_1$ through $\lambda_N$ in such a way that the reference spectral component $\lambda_c$ is maintained at the predetermined location $x_o$. The electronic circuitry and the associated signal processing algorithm/software for a processing element in a servo-control system are known in the art of electrical engineering and servo control systems.

Those skilled in the art will appreciate that instead of (or in conjunction with) moving the optical-sensing array 240 as described above, the focusing lens 230 in FIG. 2A may be alternatively (or additionally) moved, e.g., translated or rotated, thereby controlling the impinging locations of the diffracted optical beams and performing a similar alignment function. The translation/rotation of the focusing lens 230 may be accomplished by coupling to it an appropriate actuation device as described above. In some instances, the alignment adjustment may also be brought about (or complemented) by moderate variation in the incidence angle of the input multi-wavelength optical signal (along with the reference signal) upon the diffraction grating 220, e.g., by way of rotating the grating or placing a dynamically adjustable mirror between the input port 210 and the diffraction grating 220, so long as such an adjustment does not substantially alter the pitch of the spectral array formed by the diffracted optical beams. As will be appreciated from the teachings of this specification, one skilled in the art would know how to devise an appropriate alignment-adjusting element and corresponding processing element for a servo-based alignment compensation unit according to the present invention, to best suit a given application.

Figure 3A:
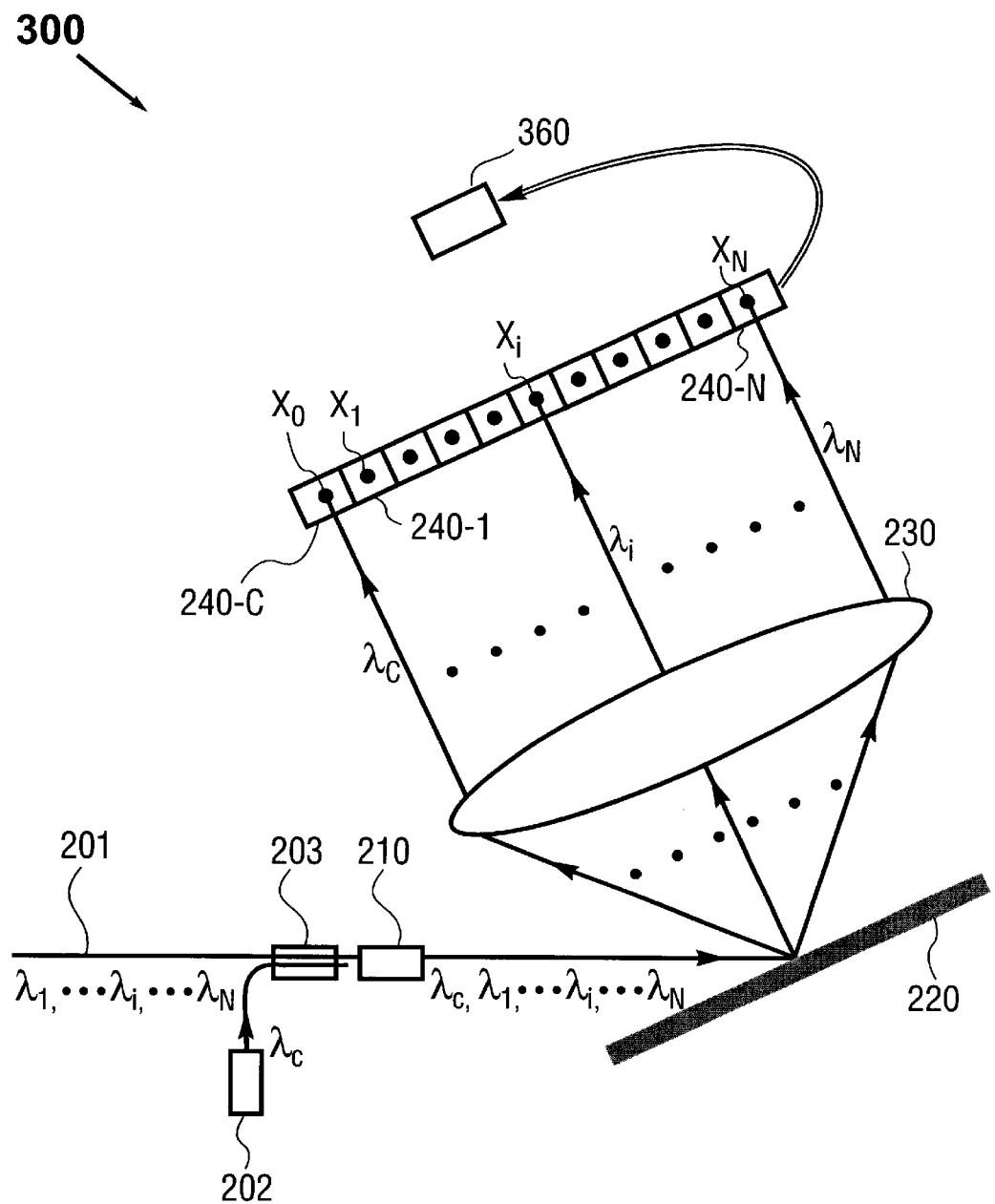
FIGS. 3A–3B show a second embodiment of a spectral power monitoring apparatus of the present invention, employing a software-based alignment compensation unit.

FIG. 3A depicts a second embodiment of a spectral power monitoring apparatus according to the present invention. By way of example, spectral power monitoring apparatus 300 may make use of the architecture as well as a number of the elements employed in the embodiment of FIG. 2A, as indicated by those labeled with identical numerals. Notice that there is no "moving" alignment-adjusting means employed in this system. Instead, a software-based alignment compensation unit 360 is implemented, which may be a signal processor in communication with the optical-sensing array 240.

Figure 3B:
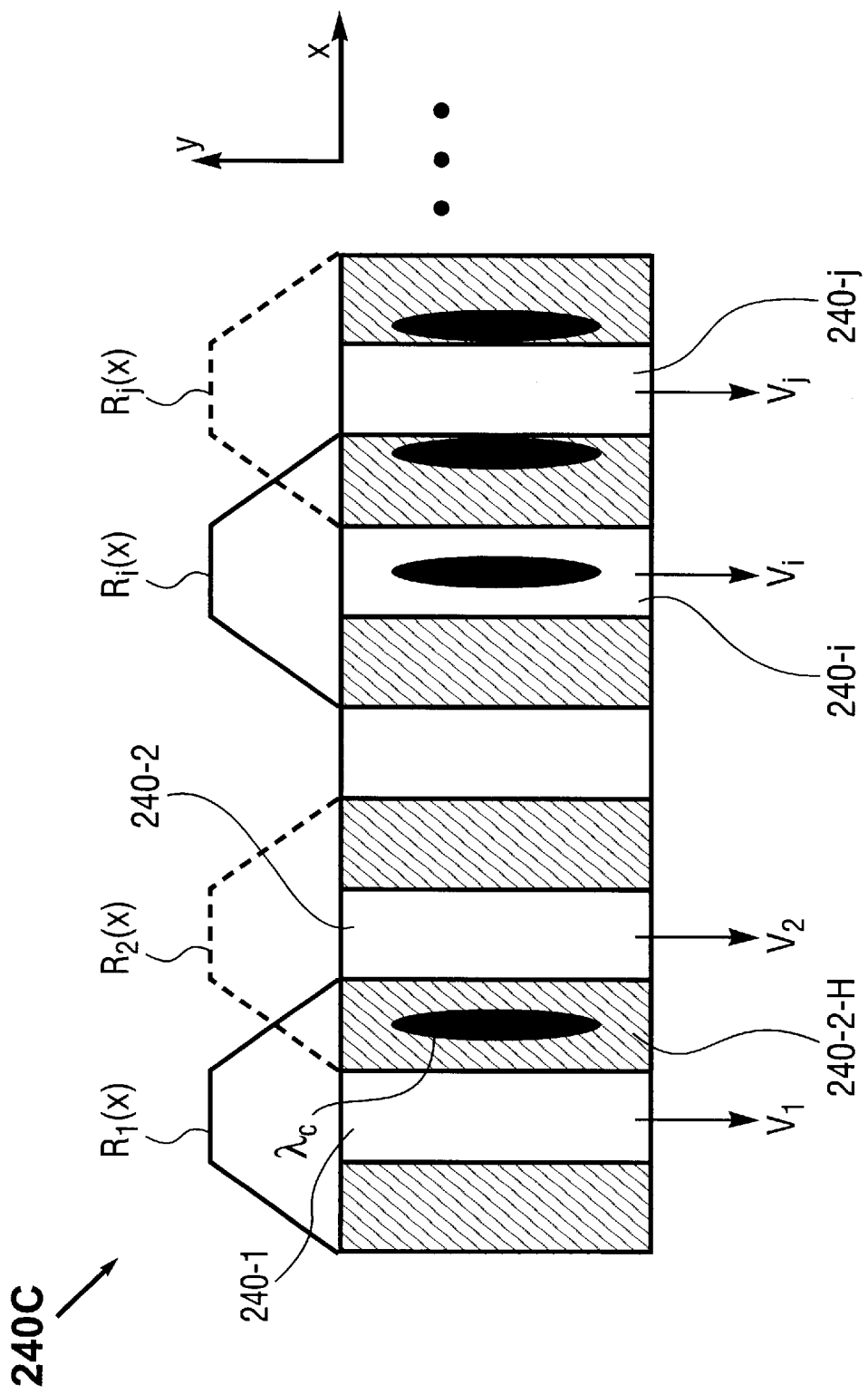

FIG. 3B shows in further detail how the optical-sensing array 240 in the embodiment of FIG. 3A may be configured. By way of example, the photodiode array 240C of FIG. 3B may be substantially similar to the photodiode array 240A depicted in FIG. 2B in configuration and operation, hence the elements are labeled with identical numerals. In this case, the impinging position of the reference spectral component $\lambda_c$ may be monitored by utilizing two or more adjacent channel-sensing elements, occupying a contiguous segment (termed "reference segment" herein) of the photodiode array 240C. For instance, if the reference spectral component $\lambda_c$ is located within two adjacent channel-sensing elements, such as those associated the non-hatched regions 240-1, 240-2 as illustrated in FIG. 3B, the voltage signals $V_1$, $V_2$ output respectively from the non-hatched regions 240-1, 240-2 may be measured using an appropriate normalized differential detection scheme, for example, by way of detecting the position error signal $(V_1-V_2)/(V_1+V_2)$ in a manner as described with respect to FIG. 2B. In the event that the reference spectral component $\lambda_c$ may undergo a shift in alignment or a "walk-off" (e.g., during the calibration or operation to be described below) that extends beyond two channel-sensing elements, the reference segment may contain multiple channel-sensing elements, and their respective output voltage signals are detected. A series of position error signals may be accordingly generated, each associated with the voltage signals output from two adjacent channel-sensing elements in this segment in a manner as described above, from which the impinging position of the reference spectral component $\lambda_c$ may be deduced. Those skilled in the art will know how to devise an appropriate signal detection and processing scheme, for effectively monitoring the real-time impinging position of the reference spectral component $\lambda_c$.

In FIG. 3B, the spectral channels $\lambda_1$ through $\lambda_N$ may impinge onto a plurality of channel-sensing elements located within a section (termed "channel section" herein) of the photodiode array 240C that is well separated from the reference segment designated from the reference spectral component $\lambda_c$, so that any voltage signal output from the reference segment does not include contribution from the spectral channels, or vice versa. The correspondence between the spectral channels and the underlying channel-sensing elements may be as depicted in the embodiment of FIG. 2B or 2C. In either scenario, the power levels of the spectral channels impinging onto the photodiode array 240C can be related to the voltage signals thus generated from the channel section of the photodiode array 240C by a predetermined conversion matrix [C], in the manner as indicated in Eq. (3) above.

The spectral power monitoring apparatus 300 in the embodiment of FIG. 3A may be operated as follows. During an initial (or factory) calibration, optical signals having the same wavelengths as the spectral channels to be detected and known power levels are coupled into the input port 210, in a way to "mimic" the spectral channels of interest. (The calibration optical signals may be provided by a tunable laser, for instance.) The calibration optical signals along with the reference signal $\lambda_c$ emerge from the input port 210, are spatially separated and subsequently impinge onto the photodiode array 240 (e.g., the photodiode array 240C of FIG. 3B) by way of the diffraction grating 220 and the focusing lens 230. The impinging location of the reference spectral component $\lambda_c$ is then varied incrementally (e.g., along the x-direction shown in FIG. 3B) with sufficient spatial resolution, which may be accomplished by translating the optical-sensing array 240 using a suitable actuation means. The position x of the reference spectral component $\lambda_c$ is then determined by the voltage signals (e.g., the voltage signal $V_1$, $V_2$) output from the designated reference section as described above. At each position x of the reference spectral component $\lambda_c$, the voltage signals produced by the calibration optical signals are also measured, which are then substituted in Eq. (2) above, along with the known power levels of the calibration optical signals, whereby the corresponding transfer-matrix [T(x)] is computed. The conversion matrix [C(x)] in Eq. (3) may in turn be derived from the transfer-matrix T(x) by using a suitable matrix computation algorithm known in the art. This calibration process thus establishes a matrix-calibration table, containing [C(x)] as a function of x, which may be stored in the alignment compensation unit 360. Subsequently in the course of operation, the alignment compensation unit 360 monitors the real-time impinging position x of the reference spectral component $\lambda_c$, and measures the voltage signals produced by the spectral channels impinging onto the channel section of the photodiode array 240C at the corresponding position x. The alignment compensation unit 360 then looks up a corresponding conversion matrix [C(x)] from the predetermined matrix-calibration table, in order to obtain the power levels of the impinging spectral channels from the measured voltage signals by use of Eq. (3) above. As such, the spectral power apparatus 300 effectively compensates for any shift in the alignment that may arise over the course of operation by way of software control, without involving any "moving" actuation means. The employment of such a software-based alignment compensation unit also relaxes fabrication tolerances and precision during initial assembly, enabling the spectral power monitoring apparatus of the present invention to be simpler in construction and more robust in performance.

It should be understood that the exemplary photo-response characteristics of the photodiode array 240A as described in FIG. 2B are provided by way of example, to illustrate the general principles of the present invention. Those skilled in the art will appreciate that other optical power sensor (or photodiode) arrays with different photo-response characteristics may be alternatively implemented in a spectral power monitoring apparatus of the present invention to provide substantially the same function in a substantially equivalent manner (e.g., as described by Eqs. (1)–(3) above). For instance, an optical power sensor array in the present invention need not necessarily possess a continuous overall photo-response function (e.g., there may be one or more "dead zones" between the photo-sensing regions). As will be appreciated from the teachings of the present invention, a skilled artisan will know to design an appropriate spectral power monitoring apparatus, to best suit a given application.

In the embodiment of FIG. 2A or 3A, the multi-wavelength optical signal containing wavelengths $\lambda_1$ through $\lambda_N$ may be provided by an input optical fiber 201 coupled to the fiber collimator serving as the input port 210. The reference signal $\lambda_c$ may be provided by a reference light source 202, which may be a distributed feedback (DFB) laser, a Fabry-Perot (FP) laser (in conjunction with an appropriate modulation/control system that suppresses the mode hopping and stabilizes the output signal), or any other light source known in the art that can provide an appropriate reference signal with well-defined and stable wavelength. An optical combiner 203 (e.g., a fused fiber-optic coupler) may be used to couple the reference light source 202 to the input optical fiber 201, effective to couple both the multi-wavelength optical signal and the reference signal into the input port 210. The spectral power monitoring apparatus thus has an independent, internal reference light source. Alternatively, the input multi-wavelength optical signal itself may include a spectral component (e.g., a service channel in an optical networking application) that can be used as the reference signal, as in WDM optical networking applications. In such a scenario, the internal reference light source 202 along with the fiber-optic coupler 203 need not be implemented. The input optical fiber 201 may be a single mode fiber, multi-mode fiber, or polarization maintaining fiber.

Moreover, the diffraction grating 220 may be a ruled diffraction grating, a holographic diffraction grating, or an echelle grating, all commonly employed in the art for separating a multi-wavelength signal by wavelength. In general, the wavelength-disperser in a spectral power monitoring apparatus of the present invention may also be embodied by other types of wavelength-separating means known in the art, such as a transmission diffraction grating or a dispersing prism. The beam-focuser 230 may alternatively be an assembly of focusing lenses, or any other suitable beam-focusing means known in the art. The focusing function may also be provided by using a curved diffraction grating that performs a dual function of wavelength-separating and beam-focusing. It should be noted that in applications where the spectral channels along with the reference spectral component are well separated, the beam-focuser, such as the focusing lens 230 in FIG. 2A or 3A, need not be utilized.

It is known that the diffraction efficiency of a diffraction grating may be polarization-dependent. For instance, the diffraction efficiency of a grating in a standard mounting configuration may be higher for p (or TM)-polarization that is perpendicular to the groove lines on the grating than for s (or TE)-polarization that is orthogonal to p-polarization, or vice versa. To mitigate such polarization-sensitive effects, a suitable polarization-sensitive element may be implemented in a spectral power monitoring apparatus of the present invention, serving to attenuate one polarization (e.g., p-polarization) component relative to the other polarization (e.g., s-polarization) component in the input multi-wavelength optical signal according to a predetermined ratio prior to impinging onto the diffraction grating, so as to compensate for the polarization dependence of the grating. This may be accomplished, for example, by placing an appropriate weak polarizer (e.g., a leaky beam-splitter) along the optical path between the input port 210 and the diffraction grating 220 in the embodiment of FIG. 2A or 3A.

Figure 4:
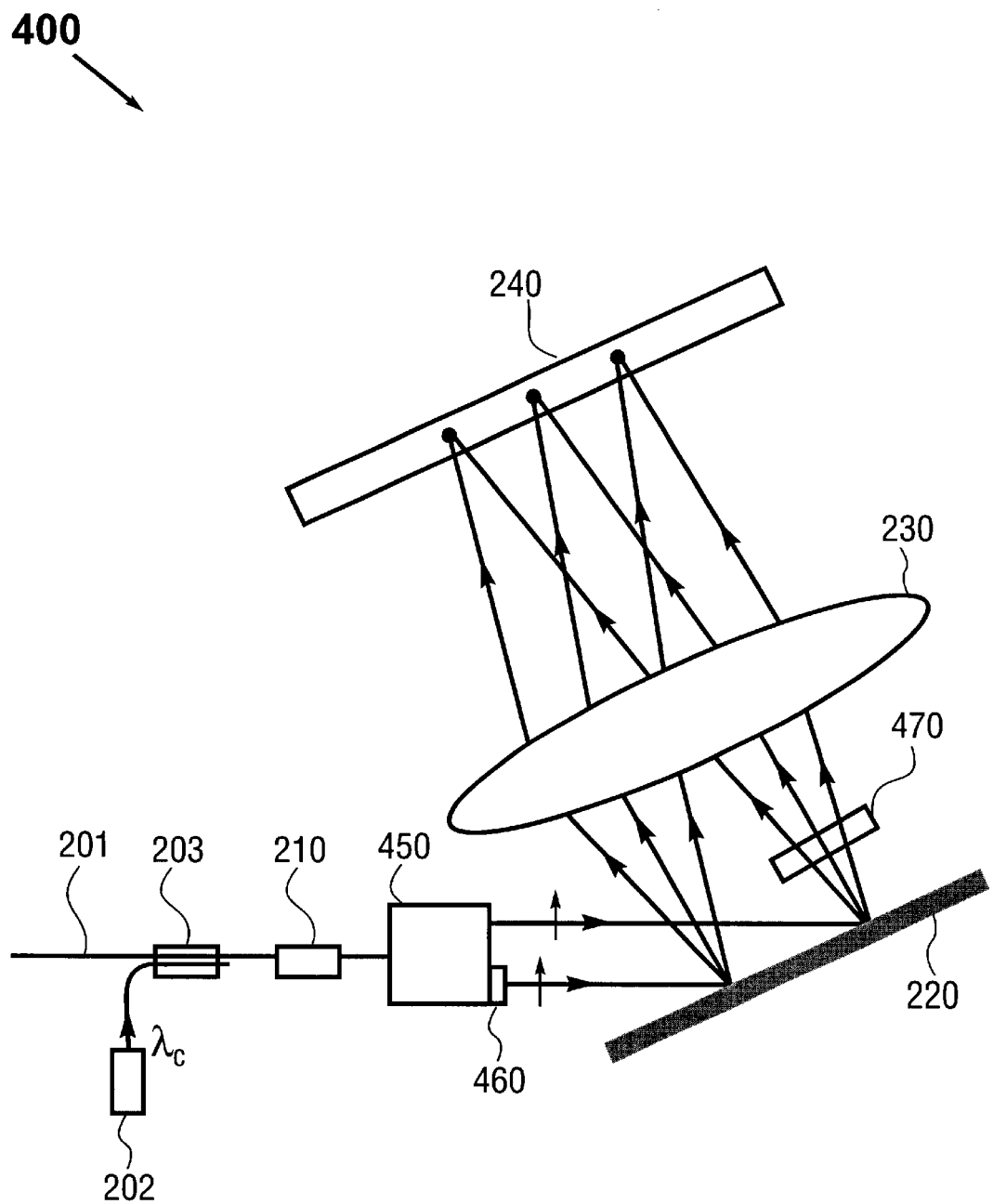
FIG. 4 depicts how a polarization diversity scheme is implemented in a spectral power monitoring apparatus of the present invention.

Alternatively, a suitable polarization diversity scheme may be implemented in a spectral power monitoring apparatus 400 of the present invention, as depicted in FIG. 4. The spectral power monitoring apparatus 400 is built upon and thus makes use of a number of the elements employed in the embodiment of FIG. 2A or 3A, as indicated by those labeled with identical numerals. In addition, the spectral power monitoring apparatus 400 includes a polarization-separating element 450 that may be disposed along the optical path between the input port 210 and the diffraction grating 220, serving to decompose the input multi-wavelength optical signal along with the reference signal into a p-polarization component and an s-polarization component (or first and second polarization components). As a way of example, assuming that p-polarization is the "preferred direction" of the diffraction grating 220 (i.e., the diffraction efficiency is higher for p-polarization than for s-polarization), the s-polarization component may then be rotated by 90-degrees by use of a polarization-rotating element 460, whereby the optical signals incident onto the diffraction grating 220 all possess s-polarization. The diffraction grating separates the incident optical signals into first and second sets of optical beams respectively, wherein each set contains optical beams with wavelengths $\lambda_1$ through $\lambda_N$. The focusing lens 230 may subsequently focus the diffracted optical beams onto the optical-sensing array 240 in such a way that the first and second optical beams associated with each spectral channel (originating from the p-polarization and s-polarization components of the spectral channel, respectively) impinge at substantially the same location (or within the same non-hatched region as depicted in FIG. 2B) on the optical-sensing array 240, as illustrated in FIG. 4. First and second reference beams, originating respectively from the p-polarization and s-polarization components of the reference signal, may also be directed at substantially the same location on the reference-position-sensing element of the optical-sensing array 240.

If it is so desired to avoid any coherent interference that may arise from the aforementioned spatial overlap of the first and second optical beams (both possessing the same polarization) associated with a spectral channel (which may produce intensity fringes, for instance), an auxiliary polarization-rotating element may be implemented between the diffraction grating 220 and the optical-sensing array 240, serving to rotate the polarization of either of the first and second sets of optical beams by 90-degrees prior to impinging upon the optical-sensing array 240. By way of example in FIG. 4, an auxiliary polarization-rotating element 470 may be disposed between the diffraction grating 220 and the focusing lens 230, in such a way that that the first set of optical beams (associated with all the spectral channels) undergoes a 90-degree rotation in polarization prior to impinging onto the optical-sensing array 240. The polarization-rotating elements 460, 470 may each be a half-wave plate, a Faraday rotator, a liquid crystal (LC) rotator, or any other polarization-rotating means known in the art that is capable of rotating the polarization of an optical beam by 90-degrees. The polarization-separating element 450 may be a polarizing beam splitter, a birefringent beam displacer, or other types of polarization-separating means known in the art.

The embodiment of FIG. 4 may further include of an alignment compensation unit, such as the servo-based alignment compensation unit 260 described in FIG. 2A, or the software-based alignment compensation unit 360 described in FIG. 3A. The optical-sensing array 240 may make use of the embodiment shown in FIG. 2B, 2C, 3B, or any other configuration in accordance with the present invention.

Those skilled in the art will recognize that the exemplary embodiments described above provide only a few of many spectral power monitoring systems according to the present invention. Various means and methods can be devised to perform the designated functions in an equivalent manner. Moreover, various changes, substitutions, and alternations can be made herein without departing from the principles and the scope of the invention. As will be appreciated from the teachings of the present invention, one skilled in the art will know how to design a spectral power monitoring apparatus employing a suitable alignment compensation unit, along with an appropriate polarization diversity scheme, to best suit a given application. For instance, by employing a photodiode array that is InGaAs based (which is particularly sensitive in the wavelength range of 1–1.7 $\mu$m) as the optical-sensing array in the above embodiments, the present invention provides a new line of spectral power monitors with active alignment compensation that would be particularly suitable for WDM optical networking applications.

Accordingly, the scope of the present invention should be determined by the following claims and their legal equivalents.

What is claimed is:

1. An optical apparatus comprising:
   a) an input port, providing a multi-wavelength optical signal and a reference signal;
   b) a wavelength-disperser that separates said multi-wavelength optical signal and said reference signal by wavelength into multiple spectral channels and a reference spectral component having a predetermined relative arrangement;
   c) an array of optical power sensors, including a reference-position-sensing element for receiving said reference spectral component and a plurality of channel-sensing elements for receiving said spectral channels; and
   d) an alignment compensation unit, including an alignment-adjusting element for adjusting an alignment of said spectral channels along with said reference spectral component and a processing element;
   wherein said processing element monitors an impinging position of said reference spectral component on said reference-position-sensing element and provides control of said alignment-adjusting element accordingly, so as to maintain said reference spectral component at a predetermined location on said reference-position-sensing element and thereby ensure a particular alignment between said spectral channels and said channel-sensing elements.

2. The optical apparatus of claim 1 wherein said alignment-adjusting element comprises an actuation device, coupled to said array of optical power sensors, for causing said array of optical power sensors to move.

3. The optical apparatus of claim 1 further comprising a beam-focuser for focusing said spectral channels and said reference spectral component into corresponding focused spots, impinging onto said array of optical power sensors, wherein said alignment-adjusting element comprises an actuation device coupled to said beam-focuser, for causing said beam-focuser to move.

4. The optical apparatus of claim 1 wherein said array of optical power sensors comprises a photodiode array.

5. The optical apparatus of claim 4 wherein each channel-sensing element receives a separate one of said spectral channels.

6. The optical apparatus of claim 4 wherein said photodiode array possesses a continuous overall photo-response function.

7. The optical apparatus of claim 6 wherein said reference-position-sensing element comprises two adjacent channel-sensing elements in said photodiode array.

8. The optical apparatus of claim 1 further comprising a signal processor, for deriving power levels of said spectral channels impinging onto said channel-sensing elements from output signals produced by said channel-sensing elements.

9. The optical apparatus of claim 8 wherein said signal processor contains a predetermined conversion matrix that relates said output signals to said power levels.

10. The optical apparatus of claim 1 wherein said wavelength-disperser comprises an element selected from the group consisting of ruled diffraction gratings, holographic diffraction gratings, echelle gratings, curved diffraction gratings, transmission gratings, and dispersing prisms.

11. The optical apparatus of claim 1 wherein said input port comprises a fiber collimator, coupled to an input optical fiber.

12. The optical apparatus of claim 11 further comprising an optical combiner, for coupling a reference light source to said input optical fiber, wherein said input optical fiber transmits said multi-wavelength optical signal and said reference light source provides said reference signal.

13. The optical apparatus of claim 1 further comprising a beam-focuser, for focusing said spectral channels and said reference spectral component into corresponding focused spots.

14. The optical apparatus of claim 1 further comprising a polarization-separating element and a polarization-rotating element, in optical communication with said input port and said wavelength-disperser, wherein said polarization-separating element decomposes said multi-wavelength optical signal along with said reference signal into first and second polarization components, and said first polarization-rotating element rotates a polarization of said second polarization component by 90-degrees.

15. The optical apparatus of claim 14 wherein said polarization-separating element comprises an element selected from the group consisting of polarizing beam splitters and birefringent beam displacers.

16. The optical apparatus of claim 14 wherein said polarization-rotating element comprises an element selected from the group consisting of half-wave plates, liquid crystal rotators, and Faraday rotators.

17. The optical apparatus of claim 14 further comprising an auxiliary polarization-rotating element, in optical communication between said wavelength-disperser and said array of optical power sensors, such that dispersed optical beams originating from said first polarization component each undergo a 90-degree rotation in polarization.

18. The optical apparatus of claim 17 wherein said auxiliary polarization-rotating element comprises an element selected from the group consisting of half-wave plates, Faraday rotators, and liquid crystal rotators.

19. An optical apparatus, comprising:
a) an input port, providing a multi-wavelength optical signal and a reference signal;
b) a wavelength-disperser that separates said multi-wavelength optical signal and said reference signal by wavelength into multiple spectral channels and a reference spectral component having a predetermined relative arrangement;
c) an array of optical power sensors, including a reference-position-sensing element for receiving said reference spectral component and a plurality of channel-sensing elements for receiving said spectral channels; and
d) an alignment compensation unit, in communication with said array of optical power sensors;
wherein said alignment compensation unit monitors an impinging position of said reference spectral component on said reference-position-sensing element, and wherein said alignment compensation unit further includes a predetermined calibration table containing a plurality of conversion matrices each corresponding to a particular impinging position of said reference spectral component, whereby for each impinging position of said reference spectral component detected, said alignment compensation unit looks up a corresponding conversion matrix from said calibration table that relates output signals from said channel-sensing elements to power levels of said spectral channels impinging onto said channel-sensing elements.

20. The optical apparatus of claim 19 wherein said array of optical power sensors comprises a photodiode array.

21. The optical apparatus of claim 20 wherein said photodiode array possesses a continuous overall photo-response function.

22. The optical apparatus of claim 21 wherein said reference-position-sensing element comprises at least two adjacent channel-sensing elements in said photodiode array.

23. The optical apparatus of claim 19 wherein said wavelength-disperser comprises an element selected from the group consisting of ruled diffraction gratings, holographic gratings, echelle gratings, curved diffraction gratings, transmission gratings and dispersing prisms.

24. The optical apparatus of claim 19 wherein said input port comprises a fiber collimator coupled to an input optical fiber.

25. The optical apparatus of claim 24 further comprising an optical combiner, for coupling a reference light source to said input optical fiber, wherein said input optical fiber transmits said multi-wavelength optical signal and said reference light source provides said reference signal.

26. The optical apparatus of claim 19 further comprising a beam-focuser that focuses said spectral channels and said reference spectral component into corresponding focused spots.

27. The optical apparatus of claim 19 further comprising a polarization-separating element and a polarization-rotating element, in optical communication with said input port and said wavelength-disperser, wherein said polarization-separating element decomposes said multi-wavelength optical signal along with said reference signal into first and second polarization components, and said polarization-rotating element rotates a polarization of said second polarization component by 90-degrees.

28. The optical apparatus of claim 27 wherein said polarization-separating element comprises an element selected from the group consisting of polarizing beam splitters and birefringent beam displacers.

29. The optical apparatus of claim 27 said polarization-rotating element comprises an element selected from the group consisting of half-wave plates, liquid crystal rotators, and Faraday rotators.

30. The optical apparatus of claim 27 further comprising an auxiliary polarization-rotating element, in optical communication between said wavelength-disperser and said array of optical power sensors, such that dispersed optical beams originating from said first polarization component each undergo a 90-degree rotation in polarization.

31. The optical apparatus of claim 30 wherein said auxiliary polarization-rotating element comprises an element selected from the group consisting of half-wave plates, Faraday rotators, and liquid crystal rotators.

32. A method of using software-based alignment compensation in spectral power monitoring, comprising:
   a) providing a multi-wavelength optical signal with a reference signal;
   b) spatially separating said multi-wavelength optical signal and said reference signal by wavelength into multiple spectral channels and a reference spectral component having a predetermined relative arrangement;
   c) impinging said reference spectral component and said spectral channels onto an array of optical power sensors; and
   d) determining an impinging position of said reference spectral component, and looking up a corresponding conversion matrix from a predetermined calibration table that relates output signals from said array of optical power sensors to power levels of said spectral channels impinging onto said array of optical power sensors, thereby providing a power spectrum of said multi-wavelength optical signal.

33. The method of claim 32 further comprising the step of performing a calibration, so as to obtain said predetermined calibration table.

34. The method of claim 32 wherein said array of optical power sensors possesses a continuous overall photo-response function.

* * * * *